US008893795B2

(12) United States Patent
Ayres

(10) Patent No.: US 8,893,795 B2
(45) Date of Patent: Nov. 25, 2014

(54) AUTOMATIC CHEMICAL TREATMENT SYSTEM WITH LIQUID LEVEL SENSOR IN CHEMICAL TANK FOR CALIBRATION AND CHEMICAL DISPENSING RATE CONTROL

(76) Inventor: Robert N. Ayres, The Woodlands, TX (US)

(*) Notice: Subject to any disclaimer, the term of this patent is extended or adjusted under 35 U.S.C. 154(b) by 425 days.

(21) Appl. No.: 13/326,551

(22) Filed: Dec. 15, 2011

(65) Prior Publication Data
US 2013/0153231 A1 Jun. 20, 2013

(51) Int. Cl.
*E21B 37/06* (2006.01)

(52) U.S. Cl.
USPC ............. 166/312; 166/54; 166/90.1; 166/902

(58) Field of Classification Search
USPC ............... 166/53, 90.1, 304, 310, 902, 75.12, 166/311, 312, 54
See application file for complete search history.

(56) References Cited

U.S. PATENT DOCUMENTS

| 5,256,171 | A | * | 10/1993 | Payne | ................................ 95/19 |
| 5,342,144 | A | * | 8/1994 | McCarthy | ....................... 405/39 |
| 5,461,903 | A | * | 10/1995 | Harms | ................ 73/40 |
| 5,974,874 | A | * | 11/1999 | Saulsberry | ................. 73/152.41 |
| 7,318,476 | B2 | * | 1/2008 | Ayres | ............................ 166/310 |
| 7,721,806 | B2 | * | 5/2010 | Ayres | ............................ 166/310 |
| 2008/0264641 | A1 | * | 10/2008 | Slabaugh et al. | .......... 166/308.2 |
| 2011/0301884 | A1 | * | 12/2011 | Denby et al. | .................... 702/55 |

* cited by examiner

*Primary Examiner* — Robert E Fuller
(74) *Attorney, Agent, or Firm* — Richard A. Fagin

(57) ABSTRACT

A wellbore chemical treating system include a storage vessel for containing a treating chemical. A chemical dispenser is in fluid communication between an outlet of the vessel and a well for selectively controlling the flow of the chemical from the vessel to the well. A liquid level sensor is disposed in the storage vessel. A controller is in signal communication with the liquid level sensor and is configured to operate the chemical dispenser. The controller is configured to adjust an operating time of the chemical dispenser based on changes in a liquid level measured by the liquid level sensor over a selected period of time.

12 Claims, 2 Drawing Sheets

US 8,893,795 B2

AUTOMATIC CHEMICAL TREATMENT SYSTEM WITH LIQUID LEVEL SENSOR IN CHEMICAL TANK FOR CALIBRATION AND CHEMICAL DISPENSING RATE CONTROL

CROSS-REFERENCE TO RELATED APPLICATIONS

Not Applicable

STATEMENT REGARDING FEDERALLY SPONSORED RESEARCH OR DEVELOPMENT

Not applicable.

BACKGROUND OF INVENTION

1. Field of the Invention

The invention relates generally to the field of chemical treatment systems for use with hydrocarbon producing wells. More specifically, the invention relates to chemical treatment systems which inject chemicals into the well.

2. Background Art

Chemical treatment systems are used in hydrocarbon producing wells to introduce various chemicals into such wells to, for example, control or prevent buildup of scale from water produced from subsurface formations, reduce or remove solid hydrocarbon deposits and to inhibit corrosion of metal components in the wellbore, among other purposes. Chemical treatment systems known in the art include chemical pumps that withdraw chemical from a storage tank and introduce the treatment chemical(s) into the wellbore.

One device known in the art for providing controllable, continuous chemical treatment for well production equipment is disclosed in U.S. Pat. No. 5,209,300 issued to Ayres. An apparatus and method described in the Ayres '300 patent include a vessel which holds the chemical and a pressurized gas which exerts a pressure on the chemical. A pressure regulator and a valve selectively control the injection of the chemical into the well as the pressurized gas urges the chemical out of the vessel. The pressurized gas drives the chemical through the regulator, valve, and into the well without venting the chemical or pressurized gas into the ambient environment. The apparatus described in the Ayres '300 patent is adapted to inject chemicals into the well in essentially undiluted form. Another chemical treatment system known in the art is described, for example in U.S. Pat. No. 7,721,806 issued to Ayres.

Chemical treatment systems known in the art dispense a selected amount of chemical with each treatment cycle by operating a valve to release chemical under pressure, or by operating an injection pump. The valve of pump may be operated for a selected period of time, either by an electromechanical timing device, an electronically programmed controller, or by signals conducted to a controller from a flow meter or similar device to measure the amount of chemical moved from a storage tank to the well. It has been observed that accuracy of such devices when dealing with small total volumes, yet at relatively high flow rates may be inadequate. Further, an amount of chemical remaining in the storage tank is typically indicated by a visual indicator, such as a sight glass. Thus, the amount of chemical may be insufficient or excessive for any particular well, and it is typically necessary for a human operator to observe the indicator to determine when it is necessary to refill the storage tank with chemical. What is needed is a system to more accurately determine the amount of treatment chemical dispensed into a wellbore, and to provide indication of an amount of chemical in the storage tank that may be interrogated remotely.

SUMMARY OF INVENTION

A wellbore chemical treating system according to one aspect of the invention includes a storage vessel for containing a treating chemical. A chemical dispenser is in fluid communication between an outlet of the vessel and a well for selectively controlling the flow of the chemical from the vessel to the well. A liquid level sensor is disposed in the storage vessel. A controller is in signal communication with the liquid level sensor and is configured to operate the chemical dispenser. The controller is configured to adjust an operating time of the chemical dispenser based on changes in a liquid level measured by the liquid level sensor over a selected period of time.

A method for displacing treatment chemical in liquid form into a well according to another aspect of the invention includes displacing a selected amount of the treatment chemical into the interior of the well from a storage vessel at selected times. An amount of the treatment chemical in the storage vessel is automatically measured. At selected times the selected amount of the chemical displaced into the well at is adjusted based on a rate of change in the measured amount of chemical in the storage vessel.

Other aspects and advantages of the invention will be apparent from the following description and the appended claims.

DETAILED DESCRIPTION

Figure 1:
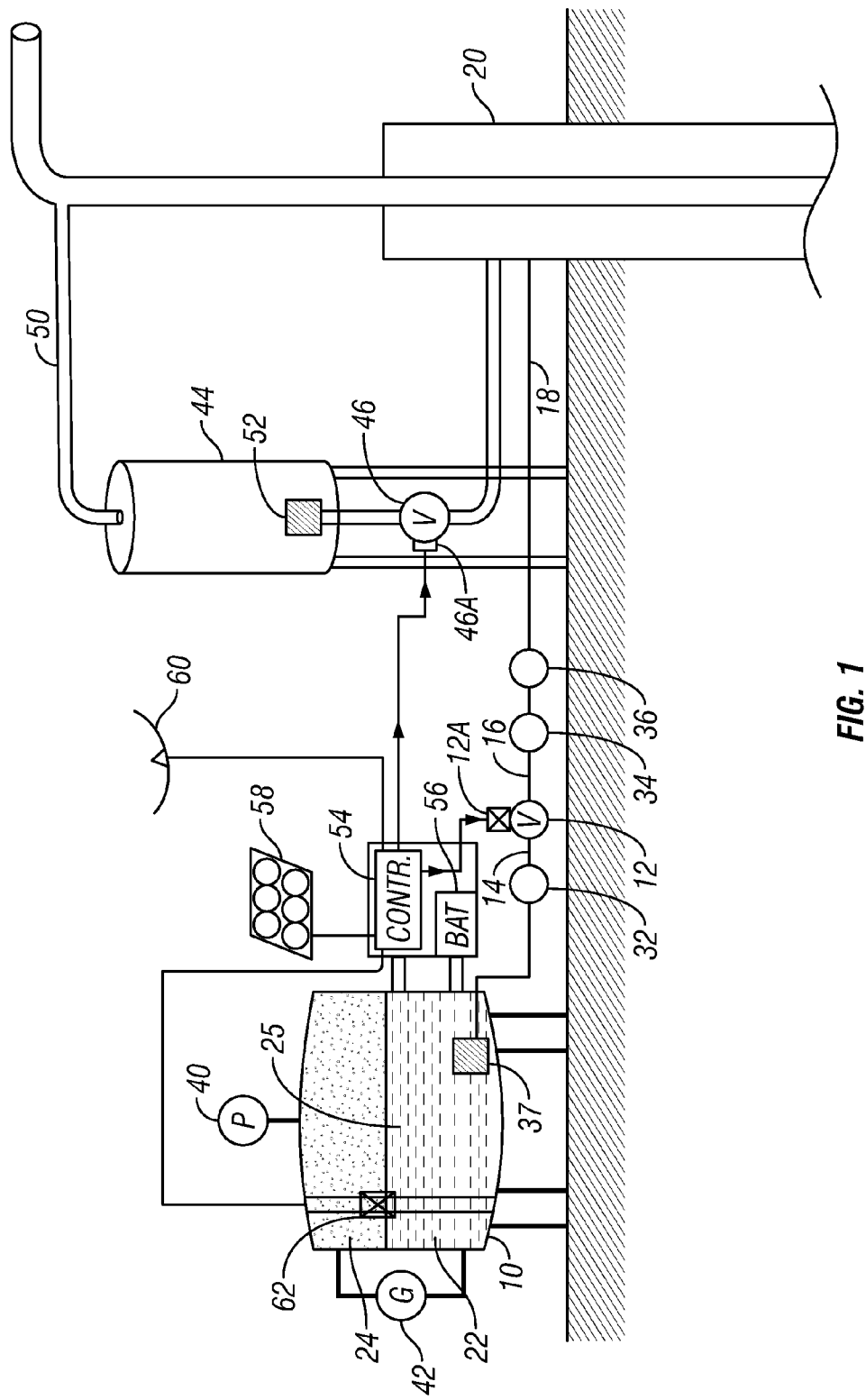
FIG. 1 shows an automatic treatment system according to one embodiment of the invention.

An example embodiment of a chemical treating system according to the invention is shown schematically in FIG. 1. A chemical dispenser vessel 10, substantially as described in U.S. Pat. No. 5,209,300 to Ayres, incorporated herein by reference, includes a container which is capable of holding an internal pressure without failure. The chemical dispenser vessel 10 is distinguishable from containers such as tanks which may only be designed to withstand the hydrostatic pressure exerted by fluid in the tank. Preferably, the chemical dispenser vessel 10 is made from glass, carbon fiber or composite fiber reinforced plastic, from stainless steel, or from any other material which is resistant to degradation induced by chemicals and corrosive gases. Alternatively, the chemical dispenser vessel 10 can include an inner lining (not shown) resistant to chemical degradation. A first control valve 12, which in the present embodiment may be actuated by an electrically operated actuator 12A, for example, a solenoid or the like, has an inlet end 14 in fluid communication with the interior of the chemical dispenser vessel 10. An outlet end 16 of the valve 12 may be connected to one end of a fluid injection line 18. The other end of the fluid injection line 18 may coupled to a hydrocarbon producing well 20. Alternatively, the actuator 12A can be a motor/gear set.

Although the well 20 is typically a hydrocarbon producing well, the present invention is useful in other wells relating to the production of hydrocarbons such as injection wells used in enhanced recovery operations. As used throughout this disclosure, the terms "well" and "hydrocarbon producing well" can include all wells directly or incidentally associated with the production from or injection of fluids into subsurface formations.

A treating chemical 22 is typically contained in the chemical dispenser vessel 10 in liquid form. It is within the scope of the invention that the chemical 22 can comprise any liquid compound or material that can be injected into a well. As representative examples, without limiting the scope of the invention, the chemical 22 can comprise chemicals generally identified as corrosion/scale inhibitors, water clarifiers, demulsifiers, and other chemicals which inhibit the formation of chemical, organic, or metallic compounds in hydrocarbon producing wells.

As shown in FIG. 1, a pressurized gas 24 is also disposed in the chemical dispenser vessel 10. The pressurized gas 24 preferably includes one or more chemically inert gases, which do not chemically react with the chemical 22. The gas 24 may comprise readily available gases such as nitrogen, helium, argon or carbon dioxide. The pressurized gas 24 may be initially charged to a pressure which is less than the condensation pressure for such gas. The condensation pressures are commonly known for each gas, and are not exceeded within the chemical dispenser vessel 10 to prevent the mixing, in the liquid phase, of the pressurized gas 24 with the chemical 22. In addition, the density of pressurized gas 24 is preferably less than the density of the chemical 22 so that the chemical 22 is concentrated toward the bottom end of chemical dispenser vessel 10, and the pressurized gas 24 is concentrated toward the upper end of the chemical dispenser vessel 10. As shown in FIG. 1, the pressurized gas 24 is in contact with the chemical 22 at an interface 25 and pressurizes the chemical 22 to the same pressure as that of the pressurized gas 24.

As shown in FIG. 1, a pressure regulator 32 may be installed between the outlet of the chemical dispenser vessel 10 and an inlet 14 of the control valve 12. The pressure regulator 32 controls the pressure of the chemical 22 which is communicated to the inlet 14 of the valve 12. For example, if the pressure of the pressurized gas 24 and the chemical 22 in the chemical dispenser vessel 10 is 500 pounds per square inch (psi), the regulator 32 can reduce the pressure of the chemical 22 at the inlet 14 of the valve 12 to a selected pressure that is greater than the well 20 pressure. As a representative example, if the pressure in the well 20 is 90 pounds per square inch (psi), and the desired pressure differential across the valve 12 is 10 psi, then the regulator 32 may be set to reduce the discharge pressure of the chemical 22 from 500 psi to about 100 psi. The regulator 32 should not reduce the pressure of the chemical 22 below the pressure in the well 20 because this would prevent the chemical 22 from entering the well 20. A fluid line 18 may conduct the chemical to the well 20.

To prevent inadvertent backflow of well fluids into fluid line 18, a check valve 36 may be installed in the line 18. The control of the pressure differential across valve 12 can be important because the flow rate through certain types of valves is dependent on the size of the valve orifice and the pressure differential between the valve inlet and outlet ports. As the pressure differential across a valve increases, the flow rate through the valve will typically increase unless the valve is designed to maintain a steady flow rate in response to varying flow pressures. As steady rate valves are more expensive than other valves which do not have a pressure compensation feature, the pressure regulator 32 may provide an inexpensive solution for controlling the flow rate of chemical through the valve 12. The regulator 32 is also useful because the use of the regulator 32 in conjunction with the valve 12 permits the precise metering of small quantities of the chemical 22.

In some embodiments, such as shown in FIG. 1, a flow meter 34 can be located between the valve 12 and the well 20. The valve 12, the first regulator 32, and the flow meter 34 are each in fluid communication with the interior of the chemical dispenser vessel 10 and the well 20 through the line 18. In the present embodiment, any pressure fluctuations in the chemical dispenser vessel 10 and in the well 20 are thus isolated from the valve 12. Consequently, the pressure differential acting across the valve 12 can be precisely controlled, thereby permitting effective control over the flow rate of the chemical 22 through the valve 12. The present embodiment permits the flow rate of the chemical 22 to be controlled to a very precise rate, even substantially less than one one-thousandth of a gallon per day.

In operation, the valve 12 is initially closed to prevent the release of the chemical 22 from the chemical dispenser vessel 10. The valve 12 is then selectively opened and the pressurized gas 24 urges the chemical 22 through the first regulator 32, the valve 12, the second regulator 34 through the line 18, and into the well 20.

Preferably, the opening of the valve 12 is timed to selectively control the flow of chemical 22 into well 20. The valve 12 can be operated at particular open durations to selectively increase or decrease the amount of the chemical 22 injected into the well 20. The precise injection amount of the chemical 22 accomplishes several objectives. Certain wells may require large volumes of chemicals to accomplish the desired function. Other wells may require only relatively small quantities of chemicals to accomplish the desired results. For example, certain wells may require only a fraction of a gallon per day to accomplish the desired result, and the injection of additional chemicals is unnecessary to the operation of the well. If more chemical than required is injected into the well, then the excess chemical is superfluous to the operation of the well and results in additional cost to the operator. The present invention selectively controls the flow amount of the chemical 22 and eliminates unnecessary chemical use.

The apparatus of the present invention can be configured to control the flow of chemical 22 by selecting the operating time and frequency of operation of the valve 12 from any chemical amount, ranging from essentially a continuous discharge of the chemical 22 from the chemical dispenser vessel 10, to any amount even as small as one one-thousandth of a gallon per day or less.

As previously explained, the check valve 36 may also be installed in the injection line 18 to prevent the backflow of fluids in the well 20 into the valve 12 or the chemical dispenser vessel 10. This feature is desirable because a well operator could accidentally pressurize well 20 to a pressure higher than that of the chemical 22 in the chemical dispenser vessel 10. Alternatively, this function could be incorporated into the design of the valve 12.

In some embodiments, a float 37 or similar means can be located in the chemical dispenser vessel 10 to prevent the pressurized gas 24 from exiting the chemical dispenser vessel 10. The float 37 has a density less than that of the chemical 22 and is buoyant therein. As the level of chemical 22 is lowered in the chemical dispenser vessel 10 by releasing the chemical 22 through the valve 12, the float 37 will be lowered in the chemical dispenser vessel 10. When the float 37 reaches a selected position within the chemical dispenser vessel 10, the float 37 seals the outlet of the chemical dispenser vessel 10 to prevent the release of the pressurized gas 24 from the chemical dispenser vessel 10. This function can be performed other than by using the float 37. For example, a liquid level gauge 42 could be used to indicate the level of the chemical 22 within the chemical dispenser vessel 10 so that an operator could visually check the level of the chemical 22. In other embodiments, mechanical, electrical, or electronic equipment could be used to indicate the level of the chemical 22 within the chemical dispenser vessel 10 or, alternatively, to seal the outlet when the level of the chemical 22 in the chemical dispenser vessel 10 is lowered to a certain position. A pressure gauge 40 can be attached to chemical dispenser vessel 10 to measure the pressure of the pressurized gas 24. The gauge 42 can be attached to the chemical dispenser vessel 10 for measuring the quantity of the chemical 22 in the chemical dispenser vessel 10. The gauge 42 can comprise many different embodiments such as sight glasses, electromagnetic switches, and other devices well-known in the art. In addition, the gauge 42 could comprise a flow meter which measures the quantity of liquid flowing from the chemical dispenser vessel 10. When the liquid quantity flowing from the chemical dispenser vessel 10 is compared to the quantity of the chemical 22 initially installed in the chemical dispenser vessel 10, the quantity of the chemical 22 in the chemical dispenser vessel 10 at any point in time can be determined.

In the present invention, the control valve 12 can be operated electrically, such as by the actuator 12A. The actuator 12A can be operated by a controller 54 of any type known in the art, such as a programmable logic controller, for electronic control of operation of a process operating device. The controller 54 may be supplied with electrical power by a battery 56. The battery 56 may be recharged by a solar cell 58. The foregoing electrical power to operate the controller 54 and the actuator 12A are not intended to ultimately limit the scope of the invention, but are preferred for economy and reliability of operation.

The present example embodiment may include a fluid storage tank 44. The fluid storage tank 44 may receive produced fluid from the well 20 through a flowline 50 coupled to an outlet of the well 20. The fluid storage tank 44 may be made so that it can hold internal pressure equal to the pressure at the outlet of the well 20. As fluid is produced from the well 20, some of it will enter the flowline 50 and ultimately fill the tank 44. The fluid storage tank 44 may include at its discharge end a float 52 similar in operation to the float 37 on the chemical dispenser vessel 10. The outlet of the fluid storage tank 44 is in hydraulic communication with the well 20 through a flush control valve 46 operated by a motor/gear set 46A. It has been determined through experimentation with various types of valve actuators that using a motor/gear set to actuate the flush valve 46 reduces the incidence of improper valve operation due to contamination of the valve from materials present in the fluid produced from the well 20. A motor/gear set is also less susceptible to the valve 46 being improperly opened by high pressures extant on the outlet side of the flush control valve 46. The motor/gear set 46A can also be operated by the controller 54. When the flush control valve 46 is operated, fluid in the tank 44 may flow into the well 20. By having equal pressure on the well 20 and the tank 44, fluid in the tank 44 may simply flow by gravity into the well 20.

In the present embodiment, the controller 54 may be programmed to operate the control valve 12 to selectively discharge the chemical 22, and the flush control valve 46 for the fluid stored in the fluid storage tank 44 at selected times and durations. Operating the first control valve 12, as previously explained, causes injection of a selected amount of the chemical 22 into the well 20. At substantially the same time, operation of the second control valve 46 causes the contents of the fluid storage tank 44 to flow by gravity into the well 20. Thus, a chemical treatment is supplied to the well 20 that is already dispersed in fluid (which may include oil and/or water) prior to reaching the bottom of the well 20, in the event the fluid level in the well 20 is too low to properly disperse the chemical 22 by itself.

In some embodiments, the float 52 may include a switch (not shown separately) so that the controller 54 will not operate the valves 12, 46 if the level of water in the water tank 44 falls below a selected level. In some embodiments, the flush control valve 46 can be operated to discharge essentially the entire contents of the fluid storage tank 44 at each operation. In other embodiments, the flush control valve 46 can be operated to discharge a selected amount of the contents of the fluid storage tank 44. In other embodiments, the flowmeter 34 and the check valve 36 may be omitted. Additionally, the controller 54 can be programmed to operate the control valve 12 and the flush control valve 46 with respect to any timing reference, such as during periods of time in which a pump (not shown) is operating to lift fluids out of the well 20, or at times during which the pump (not shown) is not operating. Alternatively, the controller 54 can be programmed to operate the control and flush control valves, 12, 46 simultaneously, or at different times from each other.

As explained in the Background section herein, the accuracy with which the amount of chemical dispensed during each operation of the control valve 12, even when measured using a device such as the flowmeter 34 may be limited. Further, and as explained in the Background section herein, the amount of chemical actually present in the chemical dispenser vessel 10 may be determined at any time by visual observation of the level gauge 42. Visual observation requires that a human operator be sent to the location of the chemical dispenser vessel 10 to observe the level. The foregoing may add substantial operating expense to the well. In the present invention, a liquid level sensor 62 may be disposed inside the chemical dispenser vessel 10. The liquid level sensor 62 may be in signal communication with the controller 54 and provide the controller 54 with an electrical or optical signal related to the level of the interface 25 inside the chemical dispenser vessel 10. The interface level 25 may be used as a proxy for the volume of chemical remaining in the chemical dispenser vessel 10 at any time. Various examples of liquid level sensor 62 will be explained below with reference to FIGS. 2, 3 and 4.

In the present embodiment, the controller 54 may include a communication transceiver (not shown separately) coupled to an antenna 60. The antenna 60 may be configured to communicate with a communications satellite in Earth orbit, or to another communications device (not shown) located away from the geodetic position of the well 20 such that signals related to the position of the liquid level sensor 62 may be communicated to a remote location, e.g., a headquarters office of the well operator. Such signals may be communicated on the basis, for example, of a selected time interval (e.g., hourly, daily, weekly, etc.), when a selected amount of level change occurs, or when the liquid level drops to a selected position within the chemical dispenser vessel 10, e.g., when chemical recharge would be expected within a selected time span.

In some embodiments, signals from the liquid level sensor 62 may be used in the controller 54 periodically or continuously such that the operating time of the control valve 12 and/or the flush control valve 46 may be adjusted. For example, if the initial programming of the controller 54 is set to operate the control valve 12 for a time interval selected to dispense a selected amount of treatment chemical into the well 20, (or to operate the control valve in response to a liquid volume measured by the flow meter 34) over an extended number of operations of the control valve 12, a corresponding change in the level of the interface 25 may be expected, such change depending on the volume of the chemical dispensing vessel 10, the geometry of the chemical dispensing vessel 10 and the expected amount of chemical dispensed in each operation of the control valve 12. If the signals from the liquid level sensor 62 indicate a different liquid level than that expected based on the controller 54 programming for operating the control valve 12, instructions in the controller 54 may be provided to automatically adjust the operating time of the control valve 12 such that the rate of change of the liquid level as measured by the liquid level sensor 62 is made to correspond to the expected rate of change. Thus, any inaccuracy in the liquid flow rate through the control valve 12 and/or liquid flow rate as measured by the flow meter 34. Alternatively, signals from the liquid level sensor 62 may be communicated to a remote location (e.g., using antenna 60) and a remotely located operator or electronic controller (not shown) may adjust the operating time of the control valve 12 to adjust for differences between expected total chemical volume dispensed and the actual chemical volume dispensed. The controller 54 may be programmed to operate the flush control valve 46 proportionately with the control valve 12.

Figure 2:
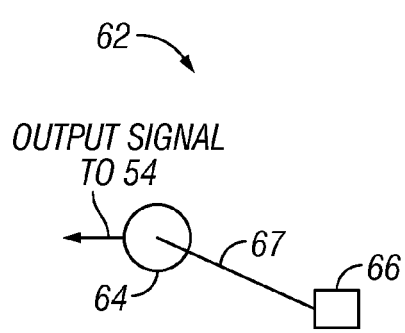
FIG. 2 shows an example liquid level sensor disposed in a chemical storage and/or dispensing tank that may be used with the invention.
Figure 3:
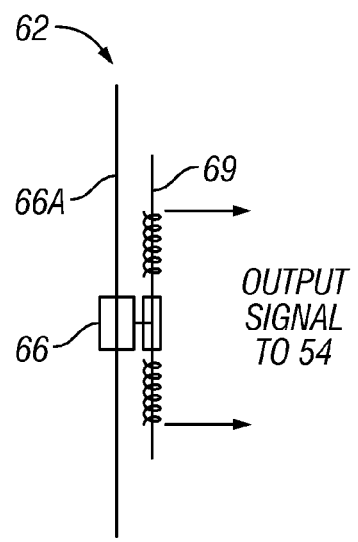
FIG. 3 shows another example liquid level sensor disposed in a chemical storage and/or dispensing tank that may be used with the invention.
Figure 4:
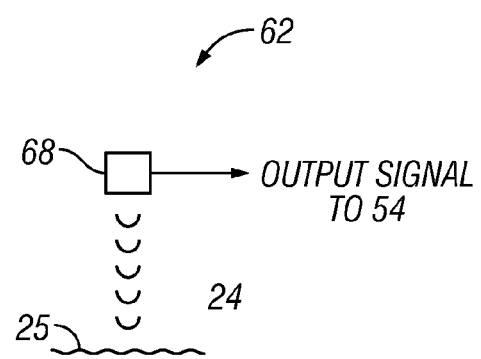
FIG. 4 shows another example liquid level sensor disposed in a chemical storage and/or dispensing tank that may be used with the invention.

Various examples of a liquid level sensor that may be used in accordance with the invention may be better understood with reference to FIGS. 2, 3 and 4. In FIG. 2, a float 66 may rest on or about the liquid/gas interface (see 25 in FIG. 1). The float 66 may be coupled as shown by an arm 67 to a rotary position encoder 64 of any type known in the art, for example a variable resistor, photoelectric encoder or magnetic position transducer.

Another example liquid level sensor is shown in FIG. 3. A float 66 may be substantially as explained with reference to FIG. 2, but may move along a substantially vertically disposed rod 66A. Position of the float 66 may be measured by a linear position transducer 69 such as a variable resistor or a linear variable differential transformer (LVDT).

Another example liquid level sensor is shown in FIG. 4. An acoustic transducer 68 may be used to determine a two-way sound wave travel time between the transducer 68 and the interface 25. The two-way travel time may be inversely related to the level of the interface in the vessel (10 in FIG. 1).

The example system shown in FIG. 1 is explained in terms of a pressurized chemical dispensing vessel as described in the Ayres patents referenced herein above. It should be clearly understood that a system according to the invention may also be used with unpressurized chemical storage vessels using chemical treatment pumps to move treatment chemical from the storage vessel to the well. In such examples, a controller (e.g., 54 in FIG. 1) may operate an electrically powered chemical pump for a selected time to move chemical to the well in the desired quantity. The operating time of such chemical pump may be adjusted substantially as explained above with reference to the control valve (12 in FIG. 1) to change the amount of dispensed chemical in response to changes in the stored chemical level over time as measured by the liquid level sensor.

It is also to be understood that the automatic flush components shown in and explained with reference to FIG. 1 may provide a system according to the invention with certain advantages over systems not having such components.

Embodiments of the invention provide a system for automatic chemical treatment of a well in which the treating chemical injection rate can be adjusted to compensate for inaccuracies in dispensing control components, and can provide the well operator with remote indication of the amount of chemical stored in a storage vessel so that visual observation of the storage vessel is not required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wellbore chemical treating system, comprising:
a vessel for containing a treating chemical;
a first control valve in fluid communication between an outlet of the vessel and a well for selectively controlling the flow of the chemical from the vessel to the well;
a liquid level sensor disposed in the vessel; and
a controller in signal communication with the liquid level sensor and configured to operate the first control valve, the controller configured to adjust an operating time of first control valve based on differences between a predetermined rate of change in a liquid level and a measured rate of change in the liquid level in the vessel measured by the liquid level sensor over a selected period of time.

2. The system of claim 1 wherein the controller comprises a communication device configured to transmit signals from the liquid level sensor to a remote location.

3. The system of claim 2 wherein an operating time of the first control valve is remotely adjustable.

4. The system of claim 1 wherein the vessel comprises a pressure vessel closed to atmospheric pressure and a pressurized gas located in the pressure vessel, and wherein pressure exerted by the pressurized gas causes the chemical to flow from the pressure vessel to the well through the first control valve.

5. The system of claim 1 further comprising a fluid storage tank in hydraulic communication with the well through a second control valve, the second control valve in signal communication with the controller, and wherein the controller is configured to operate the second control valve to selectively enable flush fluid to enter the well.

6. The system of claim 5 wherein the controller is configured to operate the second control valve for time intervals corresponding to operating times of the first control valve.

7. A method for displacing treatment chemical in liquid form into a well, comprising:
at selected times displacing a selected amount of a treatment chemical into the interior of the well from a storage vessel;
automatically measuring an amount of the treatment chemical in the storage vessel over a selected period of time to determine a measured rate of change in the measured amount of the treatment chemical in the storage vessel; and
comparing a predetermined rate of change of an amount of the treatment chemical in the storage vessel to the measured rate of change in the measured amount of chemical in the storage vessel and adjusting the selected amount of displaced chemical at the selected times based on the comparison.

8. The method of claim 7 wherein the displacing the treatment chemical comprises:
   applying compressed gas to an interior of the storage vessel to pressurize the chemical; and
   at the selected times opening a valve disposed between the pressurized chemical and the interior of the well, thereby enabling the pressurized chemical to flow into the well.

9. The method of claim 8 further comprising reducing a pressure of the pressurized liquid to a selected amount above a pressure existing in the well.

10. The method of claim 7 further comprising stopping displacing the treatment chemical when an amount of fluid in the storage vessel falls below a selected threshold.

11. The method of claim 7 further comprising enabling a flush fluid to enter the well at selected times.

12. The method of claim 11 wherein the flush fluid selected entry times correspond to the times during which the treatment chemical is displaced into the well.

\* \* \* \* \*